United States Patent
Widener et al.

(10) Patent No.: US 10,647,620 B2
(45) Date of Patent: *May 12, 2020

(54) CONSUMABLE WEIGHT COMPONENTS FOR FLARES AND RELATED FLARES

(71) Applicant: Northrop Grumman Innovation Systems, Inc., Plymouth, MN (US)

(72) Inventors: Jeffrey F. Widener, Pleasant View, UT (US); Daniel B. Nielson, Tremonton, UT (US)

(73) Assignee: Northrop Grumman Innovation Systems, Inc., Plymouth, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/169,073

(22) Filed: Oct. 24, 2018

(65) Prior Publication Data

US 2019/0055170 A1 Feb. 21, 2019

Related U.S. Application Data

(60) Continuation of application No. 14/949,702, filed on Nov. 23, 2015, now Pat. No. 10,155,700, which is a
(Continued)

(51) Int. Cl.
*C06B 27/00* (2006.01)
*C06B 45/04* (2006.01)
(Continued)

(52) U.S. Cl.
CPC .............. *C06B 45/04* (2013.01); *B29C 39/22* (2013.01); *B29C 43/32* (2013.01); *B29C 48/0021* (2019.02); *B29C 65/48* (2013.01); *C06B 45/10* (2013.01); *C06C 15/00* (2013.01); *F42B 4/26* (2013.01); *F42B 12/42* (2013.01);
(Continued)

(58) Field of Classification Search
CPC combination set(s) only.
See application file for complete search history.

(56) References Cited

U.S. PATENT DOCUMENTS 3,323,456 A 6/1967 Rothman
3,565,706 A 2/1971 Waite
(Continued)

FOREIGN PATENT DOCUMENTS

EP 0309097 A1 3/1989
WO 95/09824 A1 4/1995
(Continued)

OTHER PUBLICATIONS

Written Opinion of the International Searching Authority, ISA/EP, International Application No. PCT/US2012/062954, dated Oct. 9, 2013, four (4) pages.
(Continued)

*Primary Examiner* — James E McDonough
(74) *Attorney, Agent, or Firm* — TraskBritt (57) ABSTRACT

Flares with consumable weights connected to a forward end of the grain of the flare are disclosed. Also disclosed are consumable weight components for flares. The consumable weight components include a metal material within a matrix. Also disclosed are methods for fabricating a flare and methods for using a flare. Use of the consumable weights in the flares may reduce the amount of debris falling to ground.

15 Claims, 5 Drawing Sheets

Related U.S. Application Data division of application No. 13/289,669, filed on Nov. 4, 2011, now Pat. No. 9,194,669.

(51) Int. Cl.

| | | |
|---|---|---|
| *F42B 12/42* | (2006.01) | |
| *B29C 48/00* | (2019.01) | |
| *F42B 4/26* | (2006.01) | |
| *C06C 15/00* | (2006.01) | |
| *B29C 39/22* | (2006.01) | |
| *B29C 43/32* | (2006.01) | |
| *B29C 65/48* | (2006.01) | |
| *C06B 45/10* | (2006.01) | |
| *D03D 23/00* | (2006.01) | |
| *D03D 43/00* | (2006.01) | |
| *B29K 96/00* | (2006.01) | |
| *B29K 105/16* | (2006.01) | |
| *B29K 505/00* | (2006.01) | |
| *B29L 9/00* | (2006.01) | |
| *B29L 31/00* | (2006.01) | |

(52) U.S. Cl.
CPC ...... *B29K 2096/00* (2013.01); *B29K 2105/16* (2013.01); *B29K 2505/00* (2013.01); *B29K 2995/0037* (2013.01); *B29L 2009/00* (2013.01); *B29L 2031/747* (2013.01)

(56) References Cited

U.S. PATENT DOCUMENTS

| | | |
|---|---|---|
| 3,605,624 A | 9/1971 | Dinsdale et al. |
| 3,680,483 A | 8/1972 | Staudacher et al. |
| 3,715,248 A | 2/1973 | Swotinsky et al. |
| 3,779,008 A | 12/1973 | Henderson et al. |
| 3,788,908 A | 1/1974 | Lehikoinen et al. |
| 3,983,816 A | 10/1976 | Cornia et al. |
| 4,078,954 A | 3/1978 | Bernardy |
| 4,131,498 A | 12/1978 | Lucy |
| 4,505,203 A | 3/1985 | Brady et al. |
| H000925 H | 6/1991 | Sayles |
| 5,056,435 A | 10/1991 | Jones et al. |
| 5,071,497 A | 12/1991 | Hassell et al. |
| 5,074,216 A | 12/1991 | Dunne et al. |
| 5,237,927 A | 8/1993 | Gonzalez et al. |
| 5,561,260 A | 10/1996 | Towning et al. |
| 5,587,552 A | 12/1996 | Dillehay et al. |
| 5,700,974 A | 12/1997 | Taylor |
| 5,739,460 A | 4/1998 | Knowlton et al. |
| 5,834,680 A | 11/1998 | Nielson et al. |
| 5,886,293 A | 3/1999 | Nauflett et al. |
| 5,912,430 A | 6/1999 | Nielson |
| 6,039,820 A | 3/2000 | Hinshaw et al. |
| 6,123,789 A | 9/2000 | Nielson |
| 6,190,475 B1 | 2/2001 | Nielson |
| 6,224,099 B1 | 5/2001 | Nielson et al. |
| 6,230,628 B1 | 5/2001 | Farnell et al. |
| 6,432,231 B1 | 8/2002 | Nielson et al. |
| 6,599,379 B2 | 7/2003 | Hiskey et al. |
| 6,679,176 B1 | 1/2004 | Zavitsanos et al. |
| 6,962,634 B2 | 11/2005 | Nielson et al. |
| 6,969,435 B1 | 11/2005 | Hinshaw et al. |
| 7,025,001 B2 | 4/2006 | Brunn |
| 7,194,961 B1 | 3/2007 | Nechitailo |
| 7,469,640 B2 | 12/2008 | Nielson et al. |
| 7,556,702 B2 | 7/2009 | Koch |
| 7,866,265 B1 | 1/2011 | Kravel et al. |
| 7,886,668 B2 | 2/2011 | Hugus et al. |
| 7,887,651 B1 | 2/2011 | Mahe |
| 7,908,972 B2 | 3/2011 | Brunn |
| 7,923,662 B2 | 4/2011 | Hale et al. |
| 8,191,478 B2 | 6/2012 | Herbage et al. |
| 8,418,619 B1 | 4/2013 | Phillips |
| 8,813,649 B1 | 8/2014 | Herbage et al. |
| 10,155,700 B2 * | 12/2018 | Widener .................. F42B 4/26 |
| 2002/0003016 A1 * | 1/2002 | Ampleman ........... C06B 21/005 |
| | | 149/18 |
| 2004/0112242 A1 | 6/2004 | Brunn |
| 2006/0225599 A1 | 10/2006 | Brunet et al. |
| 2007/0295236 A1 | 12/2007 | Callaway et al. |
| 2008/0134926 A1 | 6/2008 | Nielson et al. |
| 2009/0120545 A1 * | 5/2009 | Webb ..................... C06B 29/12 |
| | | 149/76 |
| 2010/0024931 A1 | 2/2010 | Zevenbergen et al. |
| 2010/0024932 A1 | 2/2010 | Webb et al. |
| 2010/0139823 A1 | 6/2010 | Gash et al. |
| 2010/0212533 A1 | 8/2010 | Brunn |
| 2011/0036260 A1 * | 2/2011 | Herbage ................ F42B 10/52 |
| | | 102/336 |
| 2013/0112099 A1 | 5/2013 | Widener et al. |

FOREIGN PATENT DOCUMENTS

| | | |
|---|---|---|
| WO | 98/50755 A1 | 11/1998 |
| WO | 2010/123955 A1 | 10/2010 |
| WO | 2013/115865 A2 | 8/2013 |

OTHER PUBLICATIONS

International Search Report, ISA/EP, International Application No. PCT/US2012/062954, dated Oct. 9, 2013, four (4) pages.

Singh et al., New Energetic Materials for the Propulsion of Space Vehicles and Rockets, Advanced Center of Research in High Energy Materials (ACRHEM), University of Hyderabad, India, 10 pages.

Sayles, United States Statutory Invention Registration, Reg No. H925, published Jun. 4, 1991, 6 pages.

Kuwahara et al., Combustion of GAP Based Energetic Pyrolants, Propellants, Explosives, Pyrotechnics 25, (2000) pp. 112-116.

Hwang et al., Energetics of metal-organic interfaces; New experiments and assessment of the field, Material Science and Engineering R 64 (2009) pp. 1-31.

Hunt et al., Impact ignition of nano and micron composite energetic materials, International Journal of Impact Engineering 36, 2009, pp. 842-846.

* cited by examiner

CONSUMABLE WEIGHT COMPONENTS FOR FLARES AND RELATED FLARES

CROSS-REFERENCE TO RELATED APPLICATIONS

This application is a continuation of U.S. patent application Ser. No. 14/949,702, filed Nov. 23, 2015, now U.S. Pat. No. 10,155,700, issued Dec. 18, 2018, which is a divisional of U.S. patent application Ser. No. 13/289,669, filed Nov. 4, 2011, now U.S. Pat. No. 9,194,669, issued Nov. 24, 2015, the disclosure of each of which is hereby incorporated in its entirety herein by this reference.

TECHNICAL FIELD

The present disclosure, in various embodiments, relates to flares used in signaling, illumination, aircraft defensive countermeasures, or a combination of several such functions. More specifically, the present disclosure relates to flares including consumable weight components therein, consumable weight components for flares, and to methods of fabricating and using such flares.

BACKGROUND

Flares are pyrotechnic devices designed to emit intense electromagnetic radiation at wavelengths in the visible region (i.e., light), the infrared region (i.e., heat), or both, of the electromagnetic radiation spectrum without exploding or producing an explosion. Conventionally, flares have been used for signaling, illumination, and defensive countermeasure decoys in both civilian and military applications.

Decoy flares produce electromagnetic radiation through the combustion of a primary pyrotechnic material that is conventionally referred to as the "grain" of the flare. Flares, including decoy flares, configured to emit light in a visible spectrum of light may include a grain that includes magnesium and fluoropolymer-based materials. Including or excluding certain metals or other materials in the primary pyrotechnic material may alter the peak emission wavelength emitted by the decoy flare.

Decoy flares are one particular type of flare used in military applications for defensive countermeasures. Decoy flares emit intense electromagnetic radiation at wavelengths in the infrared region of the electromagnetic radiation spectrum and are designed to mimic the emission spectrum of the exhaust of a jet engine on an aircraft.

Many conventional anti-aircraft heat-seeking missiles are designed to track and follow an aircraft by detecting the infrared radiation emitted from the jet engine or engines of the aircraft. As a defensive countermeasure, decoy flares are launched from an aircraft being pursued by a heat-seeking missile. When the aircraft detects that a heat-seeking missile is in pursuit of the aircraft, one or more decoy flares may be launched from the aircraft. The heat seeking missile may, thus, be "decoyed" into tracking and following the decoy flare instead of the aircraft.

Figure 1:
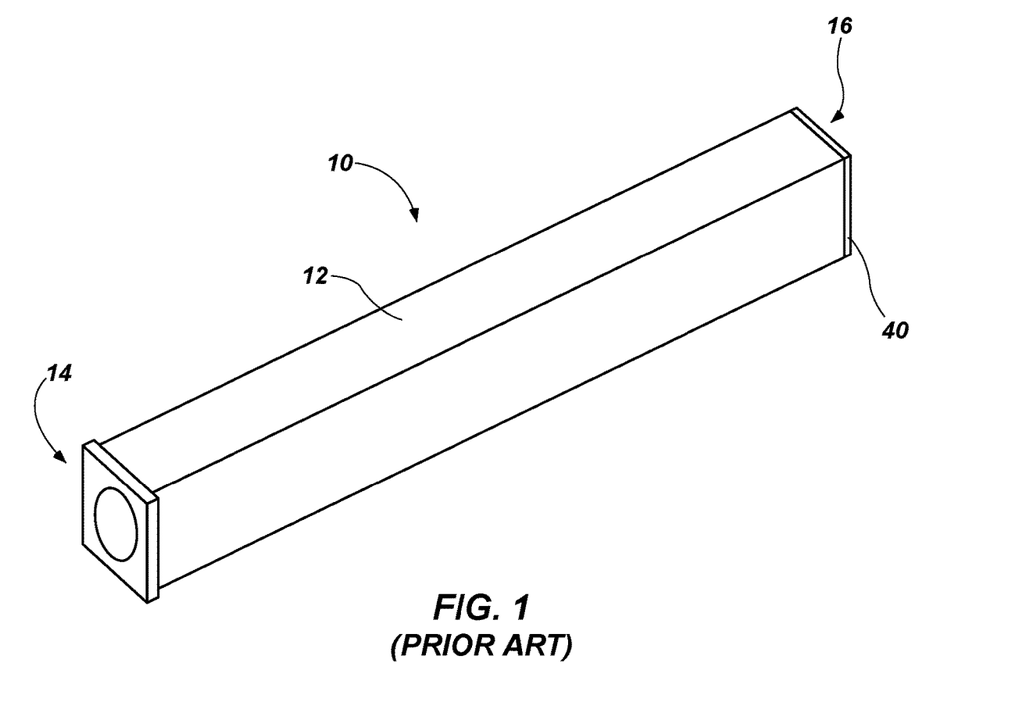
FIG. 1 is a perspective view of one example of a flare according to the prior art.
Figure 2:
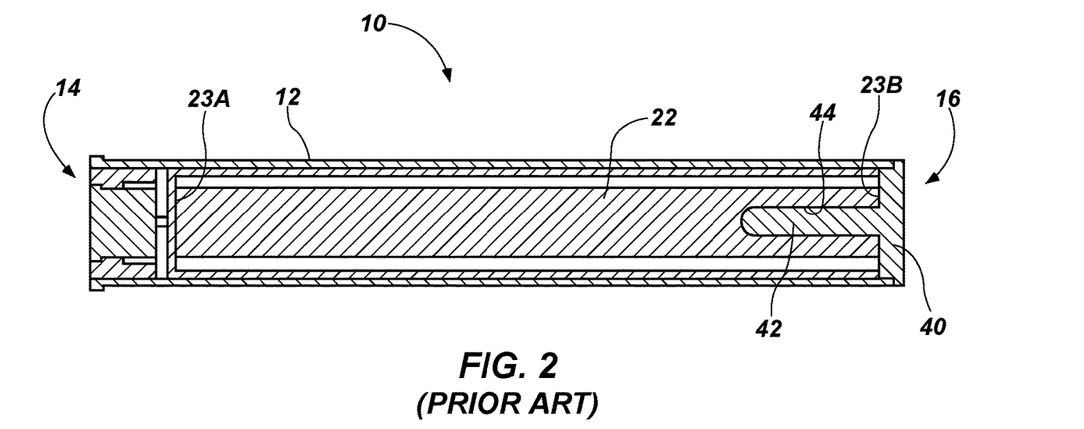
FIG. 2 is a cross-sectional view of the flare shown in FIG. 1.

FIGS. 1 and 2 illustrate a conventional flare 10, such as a decoy flare. Such conventional flares 10 include an elongated grain 22 that is inserted into a casing 12. The casing 12 may have a first end 14, i.e., the aft end, from which an aft end 23A of the decoy flare 10 is ignited, and a second end 16, i.e., the forward end opposite from the aft end, from which the grain 22 is ejected upon ignition. The flare 10 also includes a weighted end cap 40 that is attached to a forward end 23B of the grain 22. In some flares 10, the weighted end cap 40 may include an elongated rod 42 that is configured to be inserted into an internal bore 44 within the grain 22 to attach the weighted end cap 40 to the grain 22.

The weighted end cap 40 may be formed of a metal, e.g., brass, and may have a weight in the range of 30 grams to 50 grams. The weighted end cap 40 may be formed as a solid (i.e., monolithic) structure. The weighted end cap 40 is relatively small sized, compared to the grain 22, and relatively more dense than the grain 22. The majority of the weight of the grain 22 and weighted end cap 40, combined, is therefore distributed toward the forward end 23B of the grain 22 and, thus, of the flare 10. By locating the center of gravity toward the second end 16 of the flare 10, the weighted end cap 40 is configured to provide a stable trajectory to the flare 10 once ejected from the casing 12. In use, once the grain 22 of the flare 10 is combusted, the weighted end cap 40 remains essentially intact and falls to the ground below. The weighted end cap 40 falls below and behind the aircraft from which the flare 10 is ejected and, thus, presents danger to other airborne aircraft and ground-based building, vehicles, and personnel. Since multiple flares 10 may be fired at once during many evasive maneuvers, multiple weighted end caps 40 may form a so-called "cloud" of debris that is a danger to aircraft, building, vehicles, and personnel below.

BRIEF SUMMARY

Disclosed herein is a flare comprising a grain comprising a combustible material. The flare further comprises a consumable weight connected to a forward end of the grain. The consumable weight comprises metal material dispersed in a matrix.

Also disclosed herein is a consumable weight component for a flare, the consumable weight component comprising a metal material within a matrix.

Also disclosed herein is a method for fabricating a flare, the method comprising suspending a metal material within a matrix to form a consumable weight. The method further comprises affixing the consumable weight to a grain.

Also described herein is a method for using a flare. The method comprises providing a flare comprising a combustible grain and a consumable weight comprising a metal material within a matrix. The method further includes combusting the combustible grain to ignite the consumable weight. The method further includes combusting the consumable weight to produce combustion products comprising gaseous byproducts, a friable material, and unreacted metal material.

BRIEF DESCRIPTION OF THE DRAWINGS

While the specification concludes with claims particularly pointing out and distinctly claiming that which is regarded as the invention, advantages of the invention can be more readily ascertained from the following detailed description when read in conjunction with the accompanying drawings in which:

DETAILED DESCRIPTION

The following description provides specific details (such as compositions, component designs, etc.) in order to provide a thorough description of embodiments of the present disclosure. However, a person of ordinary skill in the art will understand that the embodiments of the present disclosure may be practiced without employing these specific details. Indeed, the embodiments of the present disclosure may be practiced in conjunction with conventional systems and methods employed in the industry. In addition, only those process components and acts necessary to understand the embodiments of the present disclosure are described in detail below. A person of ordinary skill in the art will understand that some materials and/or process components are inherently disclosed herein and that adding various conventional components or process techniques would be in accord with the present disclosure. The drawings accompanying the present application are for illustrative purposes only, and are not meant to be actual views of any particular material, device, or system. Additionally, elements common between figures may retain the same numerical designation.

A flare having a consumable weight component is disclosed. As used herein, the term "consumable" means and includes a material that is used up during use and operation of the flare. During use and operation of the flare, combustion of the consumable weight produces at least one of gaseous byproducts, a friable material, and unreacted material, thus, consuming the consumable weight. The consumable weight provides weight and stability to a forward portion of the flare during launch and flight of the flare. As used herein with regard to a flare, the terms "forward end," "forward portion," or "forward weight" of a flare denotes the leading end of the flare when ejected from a vehicle for use, which vehicle may be in flight, and may be characterized as the leading portion or end of the flare. Similarly, the term "forward end" of a grain denotes a leading end of the grain during flight, which leading end may be attached to a consumable weight according to an embodiment of the disclosure. The consumable weight is formed from an energetic material such that the consumable weight combusts during use and operation of the flare. The consumable weight may, ultimately, be consumed by converting the consumable material to at least one of the gaseous byproducts, friable material, and unreacted material. The friable material may disperse into ash or small particles that do not pose a danger to airborne aircraft or ground-based buildings, vehicles, or personnel, and the unreacted material may be in the form of small particles that do not pose a danger to airborne aircraft or ground-based buildings, vehicles, or personnel. The nature of the combustion products (i.e., the gaseous byproducts, friable material, and unreacted material) of the consumable weight may reduce the amount of falling debris compared to that obtained using conventional forward weights in conventional flares.

Figure 3:
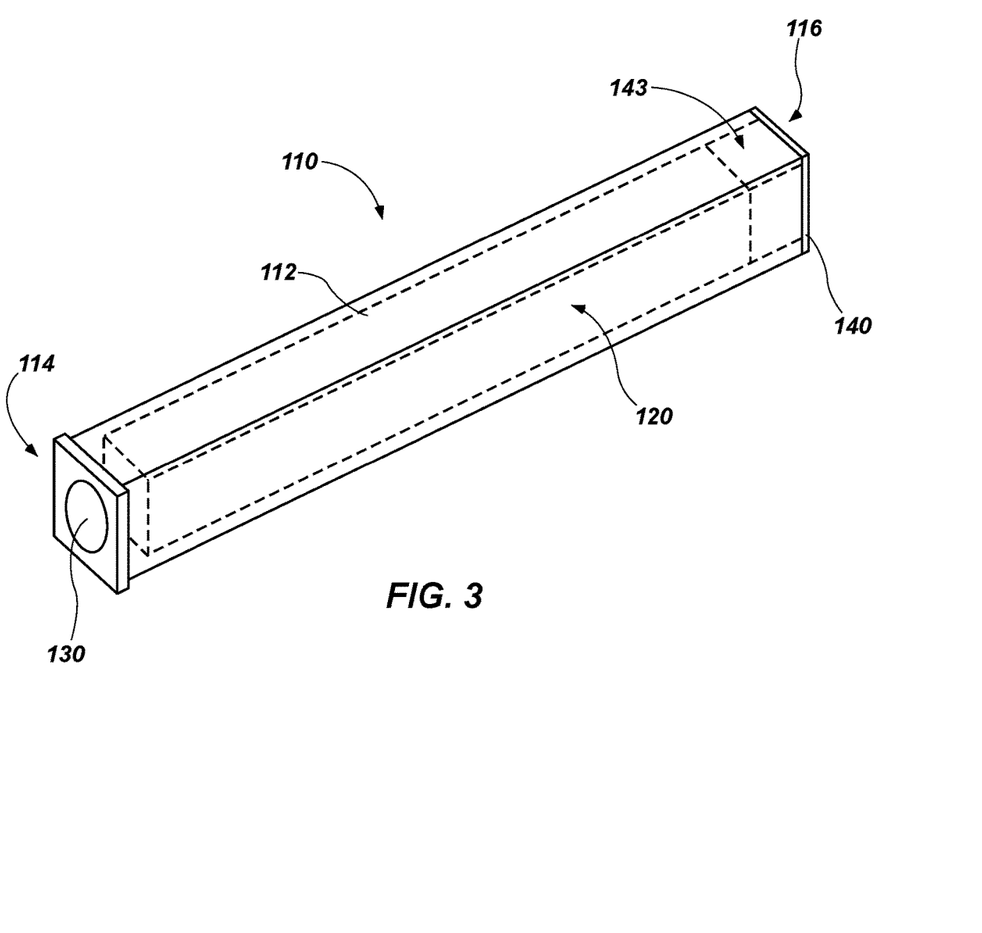
FIG. 3 is a perspective view of one example of a flare according to an embodiment of the present disclosure.
Figure 4:
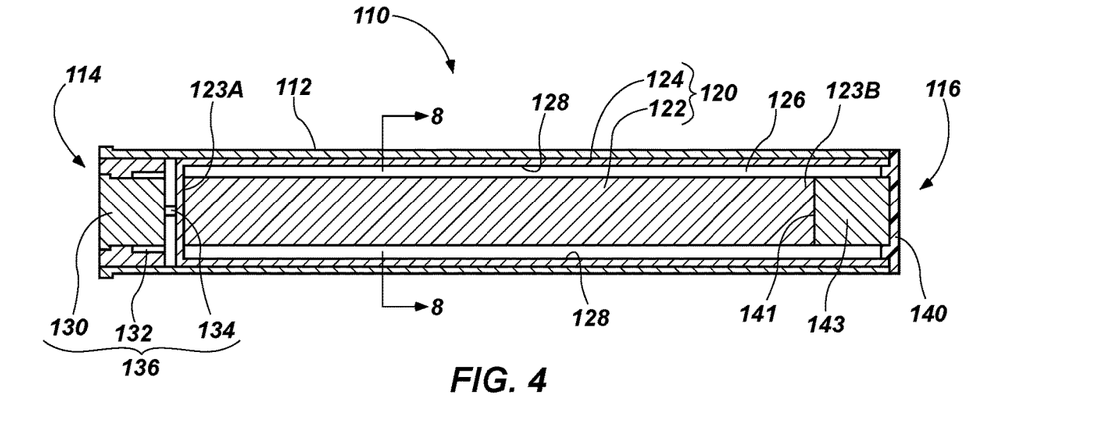
FIG. 4 is a cross-sectional view of the flare shown in FIG. 3.

One example of a flare 110 that embodies teachings of the present disclosure is shown in FIGS. 3 and 4. The flare 110 includes a grain assembly 120 that may be disposed within a casing 112. The grain assembly 120 includes a grain 122 of combustible material and a first-fire material (e.g., a reactive foil 124, discussed below) positioned relative to the grain 122. The combustible material of the grain 122 may have a composition of a conventional decoy flare grain. Such a grain 122 may include, for example, magnesium and a fluoropolymer-based material. Adding additional metals or other elements to the combustible material of the grain 122 may alter the peak emission wavelength emitted by the flare 110.

As shown in FIGS. 3 and 4, in some embodiments of the present disclosure, both the grain 122 of the grain assembly 120 and the casing 112 may have an elongated shape. The casing 112 may have a first end 114, i.e., an aft end, and a second end 116, i.e., a forward end opposite the aft end. The grain 122 of the grain assembly 120 may have an aft end 123A and a forward end 123B. The grain 122 of the grain assembly 120 may be initially positioned within the case 112 such that the aft end 123A of the grain 122 is proximate to the first end 114 of the casing 112 and such that the forward end 123B of the grain 122 is proximate to the second end 116 of the casing 112.

With continued reference to FIG. 4, a consumable weight 143 (i.e., a forward weight) may, along with the grain 122, be initially positioned within the casing 112 proximate to the second end 116 of the casing 112. An end cap 140 may, at least initially, enclose the consumable weight 143 within the casing 112. The end cap 140 may be a plastic end cap and may therefore be lighter weight and less expensive than conventional weighted end caps 40 (FIGS. 1 and 2). The end cap 140 may be configured to protect the consumable weight 143, the grain 122, and other components of the flare 110 from coming into unwanted contact with sparks or other igniting materials.

Figure 5:
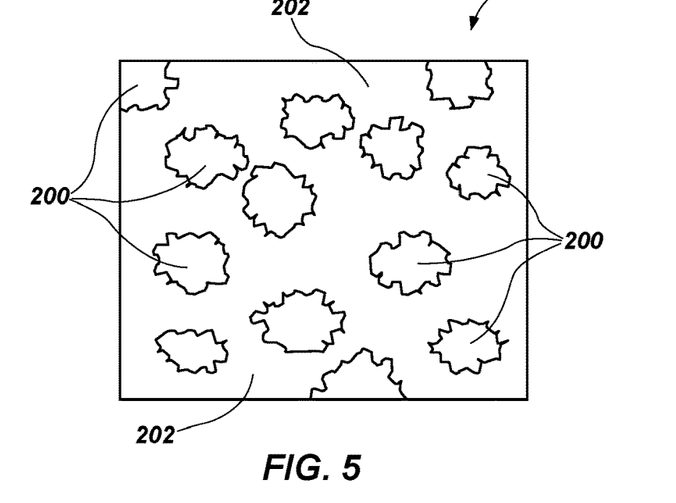
FIG. 5 is a simplified drawing showing an enlarged view of the material within a consumable weight of an embodiment of the present disclosure.

The consumable weight 143 may be formed from a metal material dispersed in a matrix. FIG. 5 illustrates the consumable weight 143 in a simplified, enlarged view. The consumable weight 143 may include matrix 202, which is an incinerable material, and metal material 200 within the matrix 202. The metal material 200 may be a metal-containing material, such as a metal, a metal oxide, a metal-containing compound, or the metal material 200 may be a metal-like material (i.e., a material exhibiting a density and resistance to burning like that of a metal, metal oxide, or metal-containing compound). The metal material 200 does not burn or incinerate relative to the material of the matrix 202. In other words, a temperature at which the metal material 200 burns is greater than a temperature at which the matrix 202 burns. The metal material 200 may be in the form of metal particles, a metal powder, or other non-consumable fill powder. In some embodiments, the metal material 200 may exhibit an average particle size equal to or less than about 60 micrometers, such as from about 30 micrometers to about 50 micrometers. In other embodiments, the metal material 200 may exhibit an average particle size larger than about 60 micrometers, though still exhibiting a particle size configured to be small enough not pose a danger to airborne aircraft or ground-based buildings, vehicles, or personnel once the matrix 202 of the consumable weight 143 has been consumed.

For example, without limitation, the metal material 200 may be any of tungsten, bismuth, lead, tantalum, tungsten carbide, a metal oxide, an alloy thereof, and a combination thereof. The metal oxide may be any of tungsten oxide, bismuth oxide, lead oxide, tantalum oxide, and a combination thereof.

The consumable weight 143 may have a density greater than or equal to the density of brass (8.4 grams per cubic centimeter to 8.73 grams per cubic centimeter). For example, in embodiments in which the metal material 200 is tungsten, the metal material 200 may have a density of about 19.3 grams per cubic centimeter, and the consumable weight 143 may have a density greater than or about equal to (e.g., not significantly lower than) the density of brass. The metal material 200 may account for between about 50 weight percent and about 98 weight percent of a total weight of the consumable weight 143. The consumable weight 143 may be substantially nonreactive in that the material does not react upon impact of the flare 110 with a target.

The matrix 202 of the consumable weight 143 may account for between 2 weight percent and about 50 weight percent of the weight of the consumable weight 143. The matrix 202 of the consumable weight 143 may include a binder, such as a polymer binder. The binder may be a curable polymer that is a liquid at a processing temperature of the consumable weight 143. Alternatively, the binder may include, partially or entirely, a solid or solids at room temperature (i.e., about 20 degrees Celsius). The binder may be an energetic or a nonenergetic material. For example, and without limitation, the binder of the matrix 202 may include an energetic binder, such as glycidyl azide polymer (GAP) or nitrocellulose (NC). The binder may alternatively or additionally include a nonenergetic binder, such as polyethylene glycol (PEG), polypropylene glycol (PPG), polybutadiene acrylonitrile (PBAN), hydroxyl-terminated polybutadiene (HTPB), cellulose acetate butyrate (CAB), carboxyl-terminated polyethylene glycol succinate polyester resin, a fluoroelastomer (e.g., VITON®), a fluorinated thermoplastic polymer (e.g., THV 220), a co-polymer thereof, or a combination thereof.

The matrix 202 may, optionally, include at least one of a plasticizer, an oxidizer, a burn rate catalyst, or other additives configured to provide the consumable weight 143 with a desired spectral emission during incineration of the matrix 202, a desired burn rate, ballistic performance, a desired intensity of the emitted light or heat, or other properties. The matrix 202 may also include at least one of the above-mentioned additives to provide the desired safety, mechanical, ignition, processing, or curing properties to the consumable weight 143. For example, the matrix 202 of the consumable weight 143 may include up to about 15 weight percent plasticizer (i.e., from 0 weight percent to about 15 weight percent plasticizer), up to about 20 weight percent oxidizer (i.e., from 0 weight percent to about 20 weight percent oxidizer), up to 5 weight percent burn rate catalyst (i.e., from 0 weight percent to about 5 weight percent burn rate catalyst), or any combination thereof, wherein the weight percentages are based on the weight of the consumable weight 143. The plasticizer may be energetic or inert. An energetic plasticizer may include, for example and without limitation, glycidyl azide polymer (GAP); 1,2,4-butanetriol trinitrate (BTTN); bis(2,2-dinitropropyl)formal (BDNPF); bis(2,2-dinitropropyl)acetal (BDNPA); 1:1 mixture of BDNPF and BDNPA (BDNPA/F); nitroglycerine (NG); butyl nitroxyethylnitramine (BuNENA); other known energetic plasticizers, or combinations thereof. An inert plasticizer may include, for example and without limitation, isodecyl pelargonate (IDP), dioctyl adipate (DOA), other known inert plasticizers, or combinations thereof. The oxidizer may include, for example and without limitation, strontium nitrate, potassium nitrate, cesium nitrate, sodium nitrate, a perchlorate, other known oxidizers, or combinations thereof. The burn rate catalyst may include, for example and without limitation, iron oxide, a conductive carbon, other known burn rate catalysts, or combinations thereof. In some embodiments, the matrix 202 includes a GAP binder and at least one of a GAP plasticizer, strontium nitrate as the oxidizer, and iron oxide as the burn rate catalyst. In some such embodiments, the consumable weight 143 may include this matrix 202 and tungsten as the metal material 200. The grain 122 used with the consumable weight 143 of some such embodiments may also include GAP. In some embodiments, the matrix 202 is GAP and the metal material 200 is tungsten.

The consumable weight 143 may be sized and configured to have a weight about equal to the weight of a conventional weighted end cap 40 (FIGS. 1 and 2), be sized and configured such that the weight ratio of the consumable weight 143 to the grain 122 is about equal to the weight ratio of a conventional weighted end cap 40 to a conventional grain assembly, or both. For example, a conventional brass weighted end cap 40 may weigh about 40 grams, and a conventional grain assembly may weigh approximately 120 to 135 grams, such that the weight ratio of the conventional weighted end cap 40 to the conventional grain assembly is about 1:3. Therefore, the flare 110 of the present disclosure may be sized and configured such that the consumable weight 143 weighs about a third the weight of the grain 122 and first-fire material (e.g., reactive foil 124).

The consumable weight 143 of the present flare 110 may be sized and configured to provide a stable trajectory of the flare 110 during use. The density of the consumable weight 143 may be selected and formulated to be greater than or about equal to the density of a conventional brass weighted end cap 40. Accordingly, the consumable weight 143 may be formulated to have a density greater than or equal to about 8.4 grams per cubic centimeter to about 8.73 grams per cubic center centimeter. In other embodiments, the consumable weight 143 may have a density less than about 8.4 grams per cubic centimeter.

The consumable weight 143 may be formulated and configured such that the density is essentially uniform throughout the consumable weight 143. For example, the consumable weight 143 may be formulated such that the metal material 200 is essentially uniformly distributed in the matrix 202 in which the metal material 200 is dispersed. In other embodiments, the metal material 200 may be more densely distributed in the matrix 202 proximate to a front side 145A (FIG. 6) of the consumable weight 143.

Figure 6:
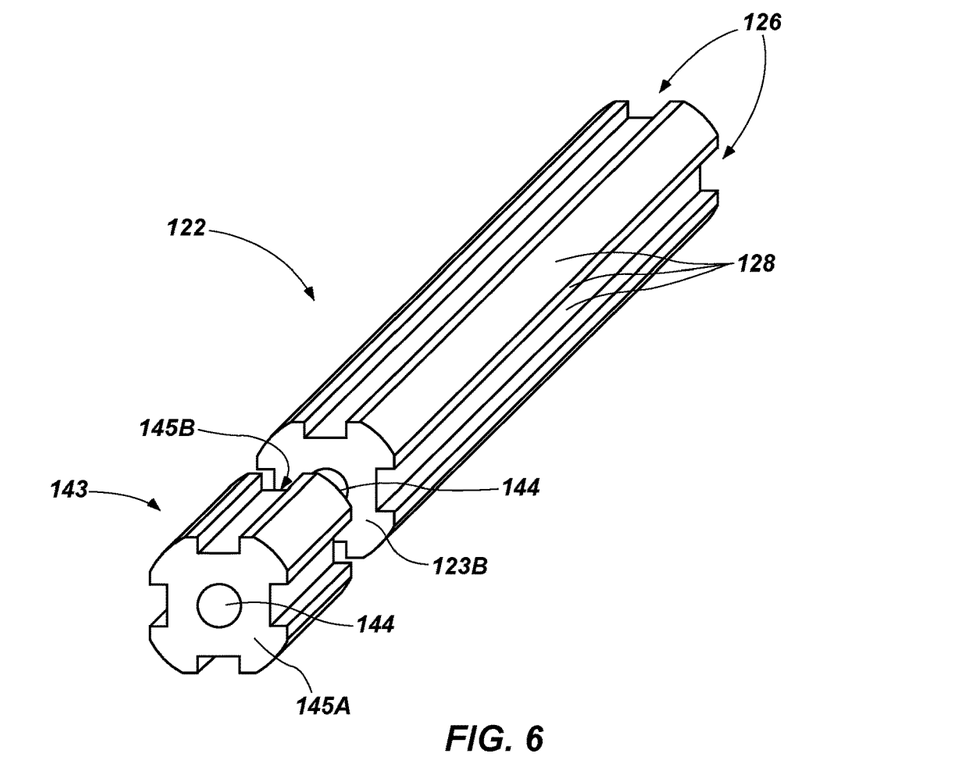
FIG. 6 is a perspective view of one example of a consumable weight and grain that may be used in a flare according to an embodiment of the present disclosure, such as the flare shown in FIGS. 3 and 4.
Figure 7A:
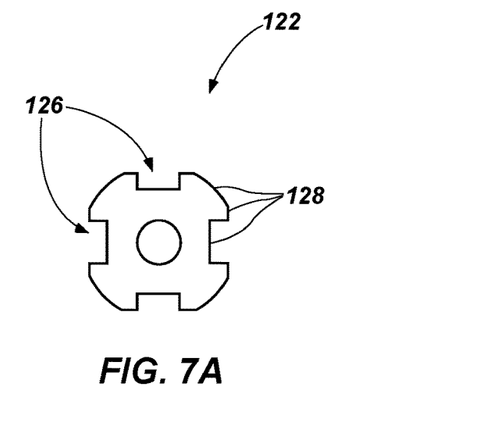
FIG. 7A is a front elevation view of the an embodiment of the consumable weight shown in FIG. 6, and is also a front elevation view of the grain shown in FIG. 6.
Figure 7B:
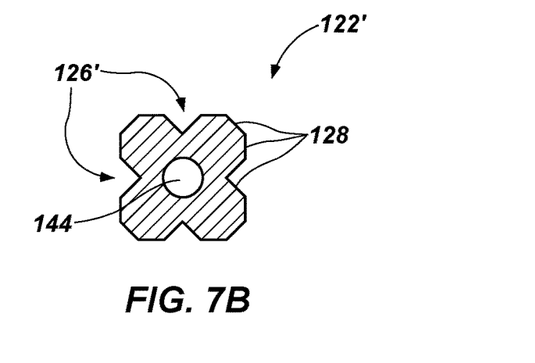
FIGS. 7B through 7E illustrate additional examples of consumable weights or grains that may be used in flares according to an embodiment of the present disclosure, such as the flare shown in FIGS. 3 and 4.
Figure 7C:
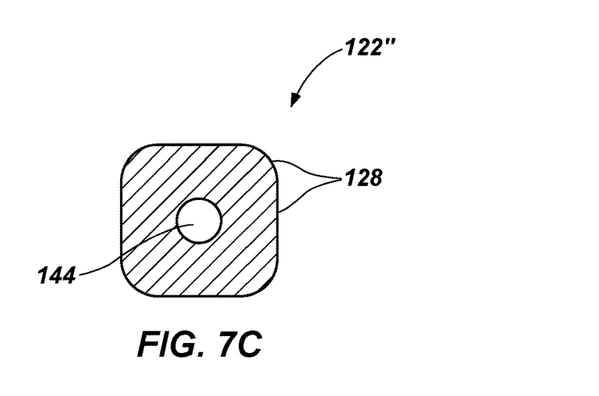
Figure 7D:
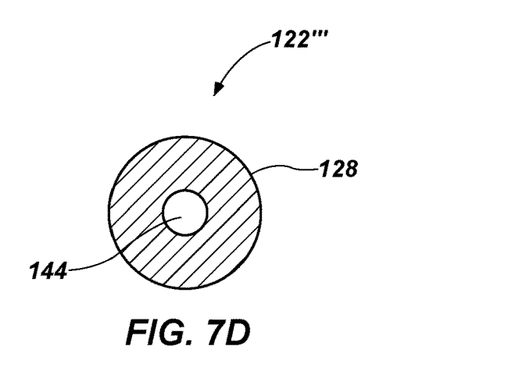
Figure 7E:
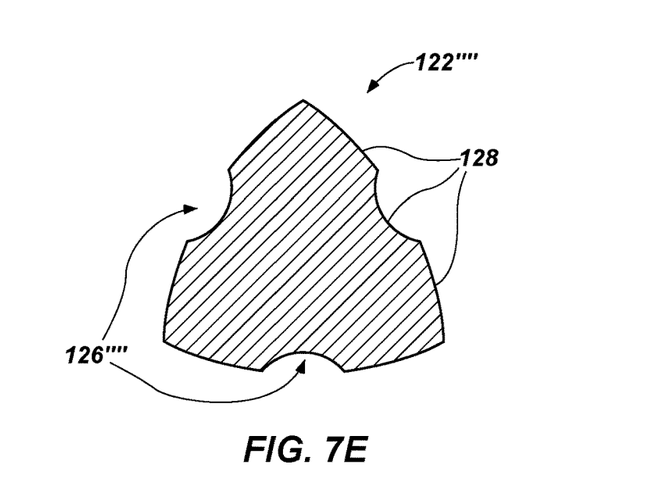

FIG. 6 illustrates the consumable weight 143 and the grain 122 of a flare 110 separated from one another. The consumable weight 143 may be formed by casting processes, curing processes, compressive processes, extrusion processes, or other processes used to form conventional flare grains. In the formed flare 110, the consumable weight 143 may be connected proximate to the forward end 123B of the grain 122. The consumable weight 143 may be connected directly to the forward end 123B of the grain 122. In some such embodiments, a rear side 145B of the consumable weight 143 may be joined to the forward end 123B of the grain 122. The consumable weight 143 may be joined to the grain 122 along an interface 141 (FIG. 4) between the consumable weight 143 and the forward end 123B of the grain 122. In other embodiments, the consumable weight 143 may be seamlessly integrated with the grain 122. Accordingly, in forming the flare 110, in some embodiments, the consumable weight 143 and the grain 122 may be formed simultaneously, e.g., co-cured, to form a unified flare 110. In other embodiments, the consumable weight 143 may be separately formed and later attached to the grain 122, such as by adhering (i.e., bonding) the consumable weight 143 to the grain 122. The binder in the matrix 202 of the consumable weight 143 may provide sufficient adhesion to join the consumable weight 143 to the grain 122. Alternatively, an adhesive composition may be used to join the consumable weight 143 and the grain 122. In one embodiment, the binder of the matrix 202 is the same as a binder within the grain 122, improving adhesion between the consumable weight 143 and the grain 122. The consumable weight 143 and the grain 122 may be formed using conventional grain-forming methods, whether formed together or formed separately and then joined. For example, the consumable weight 143 and the grain 122, whether formed together or formed separately and joined, may be formed into desired shapes or configurations by casting, pressing, extrusion, molding, curing, machining, or other conventional techniques.

A separately formed consumable weight 143 may be retrofitted to a conventional grain 22 (FIGS. 1 and 2) of a conventional flare 10 to replace the conventional weighted end cap 40. In some such embodiments, the consumable weight 143 may be formed to be about the same size and shape as the conventional weighted end cap 40 such that the consumable weight 143, according to embodiments of the present disclosure, may be attached to a conventional grain 22 and used in a conventional casing 12. Thus, the consumable weight 143 may be a drop-in replacement for the conventional weighted end cap 40 of the conventional flare 10. Therefore, the consumable weight 143 may be adherable to a grain 122 of a flare 110.

While FIGS. 3, 4, and 6 show that no portion of the consumable weight 143 is received within a portion of the grain 122, in some embodiments, the consumable weight 143 may be attached to the grain 122 by an elongated rod (e.g., elongated rod 42 (FIG. 2)). The elongated rod is connected to the consumable weight 143 and received within an internal bore 144 defined in the grain 122.

The consumable weight 143 may be formed so as to have a cross-sectional shape similar or identical to the cross-sectional shape of the grain 122. FIGS. 7A through 7E illustrate a variety of cross-sectional shapes in which the consumable weight 143 and/or the grain 122 may be formed. The consumable weight 143, the grain 122, 122', 122", 122''', 122"", or both may include one or more grooves 126, 126', 126''' along exterior lateral surfaces 128. The consumable weight 143, the grain 122, 122', 122", 122''', 122"", or both may, optionally, include an internal bore 144 configured to receive an elongated rod. Therefore, the consumable weight 143 may have a cross-sectional shape of a conventional grain 22 (FIGS. 1 and 2), regardless of whether the internal bore 144 is utilized to receive the elongated rod. The internal bore 144, along with the grooves 126, 126', 126"" may be configured to enable combustion, incineration, or both of the material forming the grain 122, 122', 122", 122''', 122"", the matrix 202, or both of the consumable weight 143. In other embodiments, such as that illustrated in FIG. 7E, the consumable weight 143, the grain 122"", or both do not include an internal bore 144.

Figure 8:
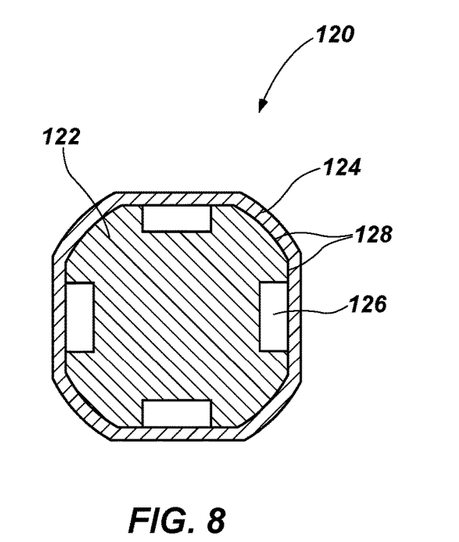
FIG. 8 is a cross-sectional view of a grain assembly of the flare of FIG. 4, taken along line 8-8.
Figure 9:
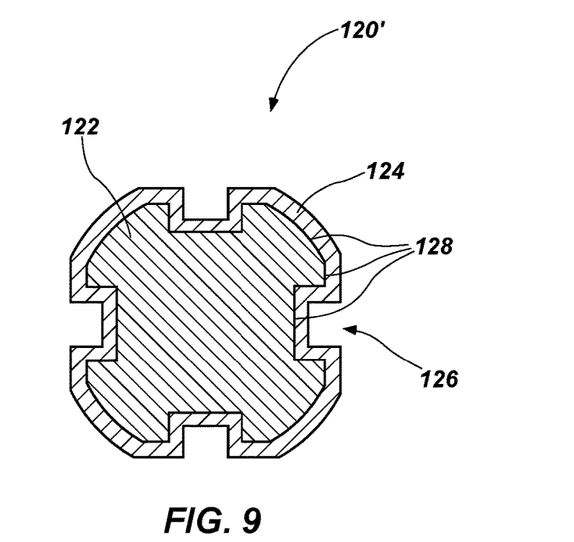
FIG. 9 is a cross-sectional view of an additional example of a grain assembly that may be used in flares according to an embodiment of the present disclosure.

With reference to FIGS. 8 and 9, exterior lateral surfaces 128 of the consumable weight 143 and/or grain 122 may be surrounded, at least partially, by a first-fire material such as a reactive foil 124. This first-fire material is included within the grain assembly 120 of the flare 110. As shown in FIG. 8, in some embodiments, the reactive foil 124 of the grain assembly 120 may come into direct contact with only some of exterior lateral surfaces 128 of the consumable weight 143, the grain 122, or both. As shown in FIG. 9, in some embodiments, the reactive foil 124 of the grain assembly 120' may be in direct contact with all exterior lateral surfaces 128 of the consumable weight 143, the grain 122, or both. Notably, though FIGS. 8 and 9 depict the grain assembly 120, 120' with reactive foil 124 in connection with the grain 122, a front elevation or cross-sectional view of the consumable weight 143 in connection with the reactive foil 124 would be an equivalent view to those depicted in FIGS. 8 and 9 of the grain assembly 120, 120'. In other embodiments, the first-fire material may include combustible powders, slurries, sol-gel compositions, or any combination thereof. The first-fire material may be configured to enable ignition of one or both of the grain 122 and the matrix 202 of the consumable weight 143.

Methods of using a flare 110 may involve a series of ignitions of various components within the flare 110. With reference to FIG. 4, an impulse charge device 130 may be provided at or within the first end 114 of the casing 112, although, in some embodiments, such an impulse charge device 130 may not be coupled to the flare 110 until the flare 110 is ready to be deployed (e.g., if the flare 110 includes a decoy flare, the impulse charge device 130 may not be coupled to the flare 110 until the flare 110 is mounted in an aircraft). The impulse charge device 130 may be configured to force the grain assembly 120, with consumable weight 143 attached thereto, out from the second end 116 of the casing 112 upon ignition of the impulse charge device 130. As shown in FIG. 4, the decoy flare 110 may include a piston member 132 disposed within the casing 112 between the impulse charge device 130 and the grain assembly 120.

In some embodiments of the present disclosure, the piston member 132 may be part of an ignition assembly 136 (often referred to in the art as an "ignition sequence assembly," a "safe and arm igniter," or a "safe and arm ignition assembly"). In some embodiments, the flare 110 may include an ignition assembly 136 having a mechanism configured to prevent ignition of the reactive foil 124 (or other first-fire material), the grain 122, and the consumable weight 143 until the grain assembly 120 and consumable weight 143 have been substantially ejected from the casing 112 by the impulse charge device 130. In other embodiments, the flare 110 may include an ignition assembly 136 that is configured to cause ignition of the reactive foil 124, or other first-fire material, and the grain 122 before the grain assembly 120 and consumable weight 143 have been substantially ejected from the casing 112 by the impulse charge device 130, or as the grain assembly 120 and consumable weight 143 are being ejected from the casing 112 by the impulse charge device 130. By way of example and not limitation, the ignition assembly 136 may include a first igniter material 134 of combustible material that is attached or coupled to the piston member 132. The first igniter material 134 may include, for example, a boron- or magnesium-based material. Combustion of the first igniter material 134 may be initiated upon ignition of the impulse charge device 130, and combustion of the first igniter material 134 may cause ignition of the grain assembly 120. By way of a more particular example and not limitation, combustion of the first igniter material 134 may cause ignition of the first-fire material, e.g., the reactive foil 124, and the reactive foil 124 may cause ignition of the grain 122. The first-fire material, e.g., the reactive foil 124, may also cause ignition of the consumable weight 143. Alternatively, the combustion of the grain 122 may cause ignition of the consumable weight 143. Combustion of the grain 122 may cause ignition of the consumable weight 143 after the grain assembly 120 and the consumable weight 143 have been ejected from the casing 112.

In use and operation of the flare 110, the grain 122 may be ignited to consume the combustible material of the grain 122, and the consumable weight 143 may be ignited to incinerate the matrix 202 (FIG. 5). Incinerating the matrix 202 may release the metal material 200. The metal material 200 may not be consumed during use and operation but may fall to the ground as particles (e.g., solid particles, friable particles, metal particles, metal oxide particles, or the like) that are relatively harmless to airborne aircraft or ground-based buildings, vehicles, or personnel. The consumable weight 143 may be configured so that the matrix 202 will complete incineration only after the grain 122 has been fully consumed. The burn rate of the consumable weight 143 may be tailored such that the consumable weight 143 provides stability and weight to the forward end of the flare 110 during use and operation of the flare 110. However, the burn rate may be sufficiently fast that the consumable weight 143 is substantially consumed (i.e., the gaseous byproducts, the friable material, the unreacted products, or any combination thereof are produced) before contacting airborne aircraft or ground-based buildings, vehicles, or personnel. The consumable weight 143, upon combustion, may break into particles or ash of a sufficient size that the particles or ash do not damage airborne aircraft or ground-based personnel or other property. Thus, the flare 110 may produce minimal amounts of debris that pose a danger to airborne aircraft or ground-based personnel or other property.

The flare 110 may be configured to be released from an airborne aircraft. In other embodiments, the flare 110 may be configured to be surface deployed so as to be projected into the air by an earth-supported device. The flare 110 may be, for example, a propulsive flare or a low thrust decoy flare. In either regard, the flare 110 may be configured such that ignition of the grain 122 will result in substantially full consumption of the combustible material of the grain 122 and such that ignition of the consumable weight 143 will result in incineration of substantially all of the matrix 202 of the consumable weight 143 before combustion products of the consumable weight 143 come into contact with airborne aircraft or any earth-supported object, such as buildings on the ground, people on the ground, watercraft in bodies of water, people in bodies of water, or the ground surface itself. The combustion products of the consumable weight 143, following incineration of the matrix 202, may include the gaseous byproducts, the friable material, such as ash, and unreacted products, such as the metal material 200. The gaseous byproducts may include, among other byproducts, carbon dioxide, carbon monoxide, water, or combinations thereof. In addition, smoke or light may be produced. The combustion products do not include the casing 112, which may be configured to be retained within the aircraft when the flare 110 is released. Therefore, the flare 110 is configured such that low amounts of debris are produced from the combustion of its components, which are unlikely to cause damage if ingested in engines of aircraft flying below or behind the aircraft from which the flare 110 is released and are unlikely to cause injury or damage to earth-supported objects, including people. In addition to flares 110, the consumable weight 143 may be used in other projectiles having weighted components (i.e., brass or other metal components) such that a reduction in falling debris from brass or other metal components in the projectiles is achieved.

The metal material 200 may be formed of fine pieces of material, such as a metal powder. Therefore, when the metal material 200 is released by the incineration of the matrix 202, the combustion products of the consumable weight 143 include fine pieces of the non-consumed metal material 200 and ash from the incinerated matrix 202. Thus, the likelihood of unwanted contact between falling solid debris and other aircraft, people, or objects below is minimized or greatly reduced compared to the conventional flare 10 (FIGS. 1 and 2) in which consumption of the grain 22 leaves a falling, essentially-solid, weighted end cap 40. The metal material 200 may exhibit an average particle size equal or less than about 60 micrometers. For example, the metal material 200 may exhibit an average particle size in the range of from about 30 micrometers to about 50 micrometers, inclusive. The combustion products of the consumable weight 143 following incineration may, therefore, include solid matter not exceeding about 60 micrometers in average particle size, e.g., solid matter with an average particle size in the range of from about 30 micrometers to about 50 micrometers. In other embodiments, the metal material 200 may exhibit an average particle size larger than about 60 micrometers, though still exhibiting a particle size configured to result in combustion products of the consumable weight 143, following incineration, that include solid matter of a small enough particle size, in light of the weight, friability, density, or other properties of the solid matter, that will not pose a danger to airborne aircraft or ground-based buildings, vehicles, or personnel.

In some embodiments of the present disclosure, the flare 110 may be configured as a decoy flare, and the combustible material of the grain 122 and/or the matrix 202 of the consumable weight 143 may be configured to emit electromagnetic radiation (upon combustion of the grain 122, consumable weight 143, or both) having a peak emission wavelength within the infrared region of the electromagnetic radiation spectrum (i.e., between about 0.7 microns and about 100 microns). In additional embodiments, the flare 110 may be configured for signaling, illumination, or both, and may be configured to emit a peak emission wavelength within the visible region of the electromagnetic radiation spectrum (i.e., between about 400 nanometers and about 700 nanometers). In yet other embodiments, the flare 110 may be configured to emit a peak emission wavelength within the ultraviolet region of the electromagnetic radiation spectrum.

The composition of the consumable weight 143 may be selected so as to achieve the desired electromagnetic radiation emissions, the desired burn rate, and other properties of an ignited flare 110.

Figure 10:
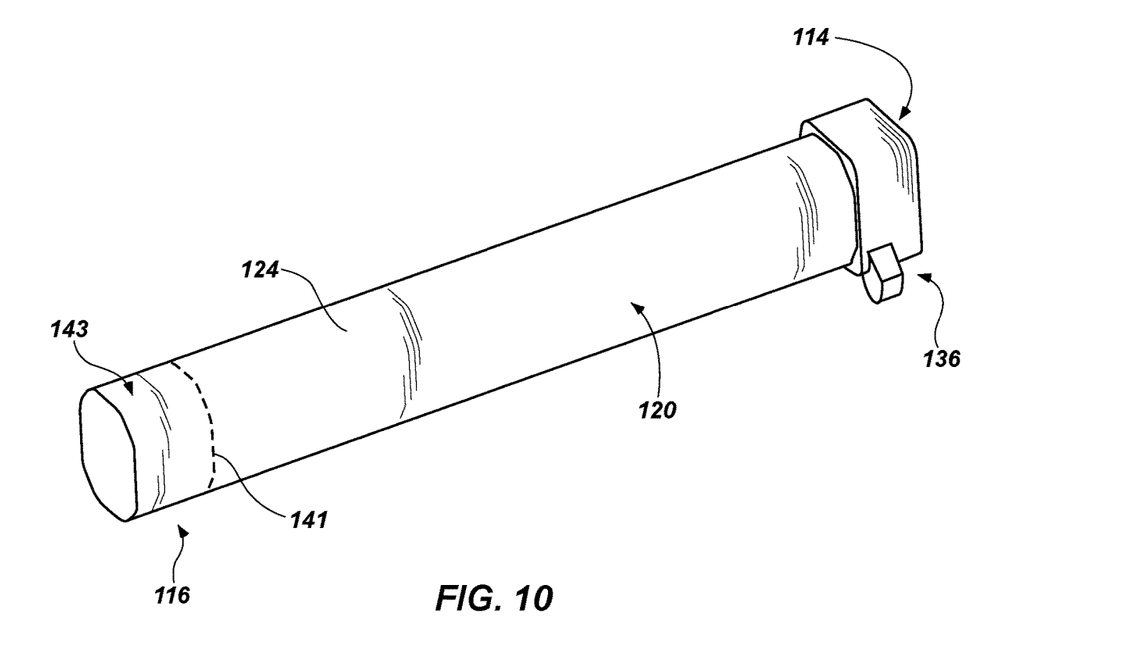
FIG. 10 is a perspective view of another example of a flare according to an embodiment of the present disclosure.

FIG. 10 illustrates another embodiment of the grain assembly 120 of the flare 110 to which the ignition assembly 136 is attached. As shown, the first fire material, e.g., the reactive foil 124 covers the grain 122 (FIG. 4) of the grain assembly 120 as well as the consumable weight 143. The illustrated grain assembly 120 and consumable weight 143 are configured to be positioned within a casing 112 (FIG. 4) prior to ignition.

Accordingly, disclosed are a flare, a forward weight, a composition of a nonreactive material, a method for fabricating a flare, and a method for using a flare.

While the present devices, compositions, and methods may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the scope of the invention as defined by the following appended claims and their legal equivalents. For example, elements and features disclosed in relation to one embodiment may be combined with elements and features disclosed in relation to other embodiments of the present disclosure.

What is claimed is:

1. A consumable weight component for a flare, the consumable weight component comprising a metal material within a solid continuous phase of a matrix, the metal material comprising from about 50 weight percent to about 98 weight percent of the consumable weight component and the matrix comprising from 2 weight percent to about 50 weight percent of the consumable weight component.

2. The consumable weight component of claim 1, wherein the metal material comprises a metal, a metal oxide, a metal alloy, or a metal-containing compound.

3. The consumable weight component of claim 1, wherein the metal material comprises metal particles or a metal powder.

4. The consumable weight component of claim 1, wherein the metal material comprises tungsten, bismuth, lead, tantalum, tungsten carbide, a metal oxide thereof, an alloy thereof, or a combination thereof.

5. The consumable weight component of claim 1, wherein the matrix comprises a polymer binder.

6. The consumable weight component of claim 1, wherein the matrix further comprises at least one of a plasticizer, an oxidizer, a burn rate catalyst, or an additive.

7. The consumable weight component of claim 1, wherein the metal material comprises tungsten or a tungsten alloy.

8. The consumable weight component of claim 1, wherein the matrix comprises glycidyl azide polymer.

9. The consumable weight component of claim 1, further comprising at least one of a plasticizer, an oxidizer, or a burn rate catalyst.

10. The consumable weight component of claim 1, further comprising at least one of a glycidyl azide polymer plasticizer, strontium nitrate, and iron oxide.

11. The consumable weight component of claim 1, wherein a density of the consumable weight is essentially uniform throughout the consumable weight.

12. A flare comprising:

a consumable weight adjacent a combustible material in a casing, the consumable weight comprising a metal material within a polymer matrix, the metal material comprising from about 50 weight percent to about 98 weight percent of the consumable weight and the polymer matrix comprising from 2 weight percent to about 50 weight percent of the consumable weight, and wherein the consumable weight is used up during use and operation of the flare.

13. The flare of claim 12, wherein at least one of the combustible material or the polymer matrix is formulated to emit a peak emission wavelength within the infrared region of the electromagnetic radiation spectrum.

14. The flare of claim 12, wherein at least one of the combustible material or the polymer matrix is formulated to emit a peak emission wavelength within the visible region of the electromagnetic radiation spectrum.

15. The flare of claim 12, wherein at least one of the combustible material or the polymer matrix is formulated to emit a peak emission wavelength within the ultraviolet region of the electromagnetic radiation spectrum.

* * * * *